United States Patent
Fukasaku et al.

(10) Patent No.: US 9,698,644 B2
(45) Date of Patent: Jul. 4, 2017

(54) ELECTRIC COMPRESSOR FOR VEHICLE

(71) Applicant: KABUSHIKI KAISHA TOYOTA JIDOSHOKKI, Kariya-shi, Aichi-ken (JP)

(72) Inventors: Hiroshi Fukasaku, Aichi-ken (JP); Shinichi Okuyama, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 317 days.

(21) Appl. No.: 14/631,951

(22) Filed: Feb. 26, 2015

(65) Prior Publication Data

US 2015/0249373 A1  Sep. 3, 2015

(30) Foreign Application Priority Data

Mar. 3, 2014  (JP) .................................. 2014-040084

(51) Int. Cl.
*H02K 3/48* (2006.01)
*H02K 3/50* (2006.01)
*H02K 1/16* (2006.01)

(52) U.S. Cl.
CPC ................. *H02K 3/48* (2013.01); *H02K 3/50* (2013.01); *H02K 1/16* (2013.01); *H02K 2201/09* (2013.01)

(58) Field of Classification Search
CPC ............................................ H02K 3/00–3/528
USPC ... 310/216.004, 216.044, 216.049, 214, 260, 310/179, 180, 184, 201, 208

IPC .................................................. H02K 3/48,3/50
See application file for complete search history.

(56) References Cited

U.S. PATENT DOCUMENTS

| 2,575,115 A * | 11/1951 | Linke ....................... H02K 3/50 24/122.6 |
| 2002/0047479 A1* | 4/2002 | Choi ........................ H02K 3/50 310/260 |
| 2011/0142696 A1* | 6/2011 | Kojima ............... F04C 29/0085 417/410.1 |

FOREIGN PATENT DOCUMENTS

JP  2008-301688 A  12/2008

* cited by examiner

*Primary Examiner* — Thomas Truong
(74) *Attorney, Agent, or Firm* — Sughrue Mion, PLLC (57) ABSTRACT

A compressor equipped with an electric motor having a stator including a stator core, coils, and a string. The stator core is formed of laminated core plates and has crimped portions in boundaries between a yoke and bases of teeth. The crimped portions are spaced at equal intervals in a circumferential direction of the stator core. Coil ends are laced by the string in such a way that the string is not passed through teeth spaces having the crimped portions disposed outward thereof in a radial direction of the stator core, but passed through the teeth spaces that are located adjacently on opposite sides of each of the teeth spaces having the crimped portions disposed radially outward thereof and also passed through at least one of any two adjacent of the teeth spaces.

3 Claims, 7 Drawing Sheets

ELECTRIC COMPRESSOR FOR VEHICLE

BACKGROUND OF THE INVENTION

The present invention relates to an electric compressor for a vehicle.

Japanese Patent Application Publication No. 2008-301688 discloses an electric compressor for a vehicle. In the electric compressor of the above Publication, a stator of an electric motor is of annular shape and includes a stator core having slots formed by a plurality of teeth and coils wound in the slots. The stator core is formed by a plurality of laminated core plates made of a metallic magnetic material. The coils are formed by wave winding. A U-phase coil, a V-phase coil, and a W-phase coil are provided in first, second, and third groups of slots, respectively.

An interphase insulating sheet is provided between the coil end of the U-phase coil that is disposed outside the first group of slots and the coil end of the V-phase coil that is disposed outside the second group of slots. Similarly, the interphase insulating sheet is provided between the coil end of the V-phase coil that is disposed outside the second group of slots and the coil end of the W-phase coil that is disposed outside the third group of slots. The coil end of each phase coil and the interphase insulating sheet are laced by a string.

In the electric compressor of the above Publication, the coil end of each phase coil and the interphase insulating sheet are laced by a string passed in a space (hereafter referred to teeth space) formed between the coil end and the tooth. A crochet needle is used for lacing by a string. The crochet needle is reciprocable in the teeth space in the radial direction of the stator core.

In a stator core that is formed by laminating a plurality of core plates, the stator core plates are fixed together by crimping so as to prevent the core plates from being delaminated. Each core plate has a projection and a recess on the opposite sides thereof at the crimped portion. Specifically, the projection and the recess of any two adjacent core plates are engaged with each other thereby to fix the core plates together. The crimped portions formed by the projections and the recesses of the core plates may be formed at a plurality of positions that are spaced at equiangular intervals and adjacent to the outer periphery of the stator core. There is a fear that the movement of the crochet needle may be hampered by the projection of the crimped portion in the end surface of the stator core as compared to other portions in the end surface of the stator core where no projection of the crimped portion may be present. Therefore, the crimped portion may be disposed so as not to hamper the movement of the lacing crochet needle and located at a position adjacent to the outer periphery of the slot. However, the provision of the crimped portion at a position adjacent to the outer periphery of the slot may pose a problem in that the flow of magnetic flux in the stator core is impeded. Furthermore, when the electric compressor is small-sized or when the number of poles of the motor is increased, the teeth space and the width of the yoke that is adjacent to the bottom of the slot become smaller, which makes it difficult for the lacing crochet needle to be free from interference with the projection of the crimped portion.

The present invention, which has been made in light of the above problems, is directed to providing an electric compressor in which the coil end can be laced securely by a string and the interference between the crochet needle and the crimped portion is prevented successfully.

SUMMARY OF THE INVENTION

There is provided an electric compressor for a vehicle that is equipped with a rotating electric machine having a stator. The stator includes a stator core, coils of a plurality of phases, and a string. The stator core is formed into an annular shape and has an annular yoke and a plurality of teeth that extends radially from the yoke to define a plurality of slots between the teeth. The stator core is formed of a plurality of laminated core plates and has a plurality of crimped portions in boundaries between the yoke and bases of the teeth or in the yoke to fix the core plates together. The crimped portions are spaced at equal intervals in a circumferential direction of the stator core. The coils of a plurality of phases are arranged on the slots, respectively. Each coil has a plurality of coil ends that extend out from one end of the stator core. A plurality of teeth spaces are defined between each coil end and the stator core and each teeth space is provided for one of the teeth, respectively. The coil ends are laced by the string in such a way that the string is not passed through the teeth spaces having the crimped portions disposed outward thereof in a radial direction of the stator core, but passed through the teeth spaces that are located adjacently on opposite sides of each of the teeth spaces having the crimped portions disposed radially outward thereof and also passed through at least one of any two adjacent of the teeth spaces.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

In view of the flow of the magnetic flux, it is desirable that the crimped portion should be formed at a position that is adjacent to and radially outward of the teeth space.

On the other hand, when the crimped portion is formed at a position adjacent to and radially outward of the teeth space, it may be so configured that the teeth space through which a string is passed and the teeth space through which the string is not passed are disposed alternately without lacing a string through all the teeth spaces. Depending on the number of the crimped portions, however, the crochet needle may be caught by the projection of some crimped portions. Furthermore, if the number of the teeth spaces for lacing a string is decreased with an attempt to reduce the chance of interference of the crochet needle with the projection in the crimped portion, the force tightening the coil end is decreased and the coil in the coil end may be moved due to vibration, with the result that insulation between the coil and the stator core may deteriorate. Incidentally, the configuration in which the plural crimped portions are formed at a plurality of positions that are spaced at equiangular intervals and adjacent to the outer periphery of the stator core is necessary for generation of well-balanced magnetic flux in the stator core. Thus, in the background art in which a plurality of crimped portions are formed at positions that are spaced at equiangular intervals and adjacent to the outer periphery of the stator core, lacing the coil end securely by a string while preventing the crochet needle from being caught in the crimped portion is difficult.

First Embodiment

The following will describes a stator as applied to an electric compressor for a vehicle according to a first embodiment of the present invention with reference to the accompanying drawings. The electric compressor for a vehicle according to the first embodiment is a scroll-type electric compressor to be mounted on a hybrid vehicle having an internal combustion engine and an electric motor as the drive source. The electric compressor for a vehicle forms a part of refrigeration circuit of a vehicle air-conditioner. Although not shown in the drawing, the vehicle air-conditioner further includes a condenser, a receiver, an expansion valve, an evaporator and tubes interconnecting these devices, as well as the electric compressor.

Figure 1:
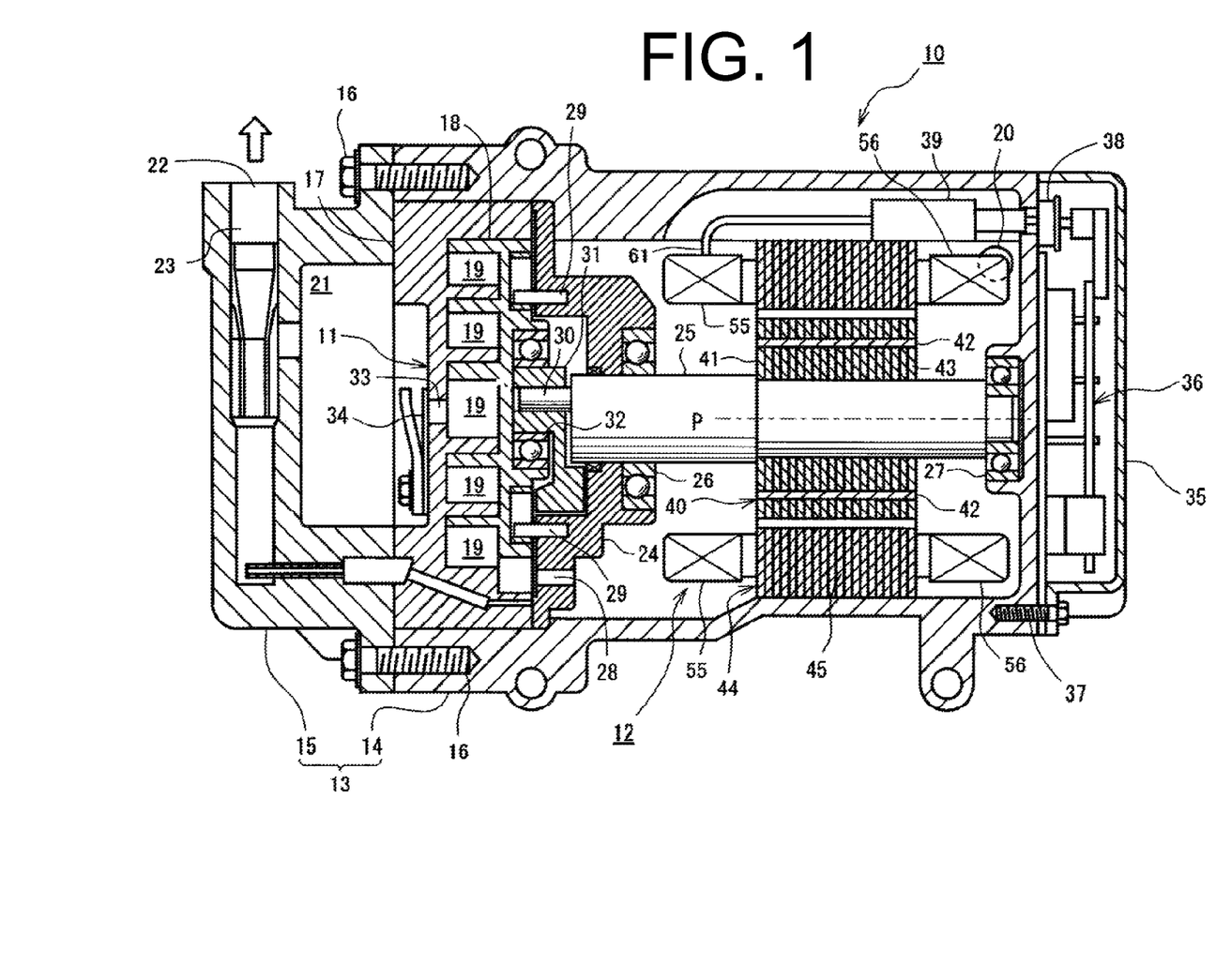
FIG. 1 is a longitudinal sectional view of an electric compressor for a vehicle according to a first embodiment of the present invention.

Referring to FIG. 1, the scroll type compressor (hereafter referred to the compressor) that is designated by numeral 10 includes a housing 13, a compression mechanism 11 for compressing refrigerant as fluid, and an electric motor 12 for driving the compression mechanism 11. The housing 13 is made of a metal. In the first embodiment, the housing 13 is made of an aluminum alloy. The housing 13 includes a first housing 14 and a second housing 15. The first housing 14 and the second housing 15 are fixedly connected at the ends thereof by bolts 16. Incidentally, the compressor 10 according to the first embodiment is mounted in a horizontal position in an engine compartment.

The first housing 14 of the compressor 10 has therein the compression mechanism 11 and the electric motor 12. The compression mechanism 11 includes a fixed scroll 17 and a movable scroll 18. A plurality of compression chambers 19 is formed by and between the fixed scroll 17 and the movable scroll 18 in the compression mechanism 11. The fixed scroll 17 is fixed to the first housing 14 and the movable scroll 18 is engaged with the fixed scroll 17 in facing relation thereto. The first housing 14 has therethrough in the upper part thereof an inlet port 20 that is connected to an external refrigeration circuit (not shown in the drawing) for providing fluid communication between the external refrigeration circuit and the interior of the first housing 14. During the operation of the compressor 10, low pressure refrigerant is drawn from the external refrigeration circuit into the first housing 14 through the inlet port 20.

The second housing 15 has therein a discharge chamber 21 that is communicable with the compression chamber 19. The second housing 15 has in the upper part thereof an outlet port 22 for providing fluid communication between the discharge chamber 21 and the external refrigeration circuit. The second housing 15 has therein a passage 23 that provides fluid communication between the discharge chamber 21 and the outlet port 22.

A shaft support member 24 is provided in the first housing 14 between the fixed scroll 17 and the electric motor 12. The shaft support member 24 forms a part of the compression mechanism 11 and has therein a bearing 26 that supports one end of a rotary shaft 25 of the electric motor 12. The other end of the rotary shaft 25 is supported by the first housing 14 through a bearing 27. The shaft support member 24 has therethrough a suction port 28 thorough which the interior of the first housing 14 is in communication with the compression chambers 19. The refrigerant drawn into the first housing 14 through the inlet port 20 is introduced through the suction port 28 into the compression chambers 19. The shaft support member 24 has anti-rotation pins 29 that are press-fitted in the shaft support member 24 and project toward the movable scroll 18. The anti-rotation pins 29 form the anti-rotation mechanism for preventing the movable scroll 18 from rotating.

An eccentric pin 30 is provided projecting from the end of the rotary shaft 25 adjacent to the fixed scroll 17 toward the fixed scroll 17. The axis of the eccentric pin 30 is positioned eccentrically with respect to the axis P of the rotary shaft 25, so that the eccentric pin 30 is eccentrically rotated with respect to the axis P of the rotary shaft 25 when the rotary shaft 25 is driven to rotate. A drive bush 31 is rotatably mounted on the eccentric pin 30.

The movable scroll 18 is rotatably mounted on the outer peripheral surface of the drive bush 31 through a bearing 32, so that the movable scroll 18 orbits relative to the fixed scroll 17 with the rotation of the rotary shaft 25. That is, the movable scroll 18 is provided so as to orbit around the axis P without rotation.

Refrigerant is drawn through the suction port 28 into the compression chambers 19 and compressed by the volume reduction of the compression chambers 19. The fixed scroll 17 has in the center thereof a discharge port 33 that is communicable with the discharge chamber 21 through a discharge valve 34 for opening and closing the discharge port 33. The compressed refrigerant is discharged through the discharge port 33 into the discharge chamber 21.

The compressor 10 includes a case 35 that is fixedly connected to the first housing 14 and accommodates a drive circuit 36 for protection thereof. The drive circuit 36 has an inverter unit, various electrical parts, and a circuit board having mounted thereon the inverter unit and the parts and controls power supply for the electric motor 12. The inverter unit has switching devices. The inverter unit receives power supply from an external power source and converts DC power to AC power for driving the compressor 10. The case 35 is fixed to the first housing 14 by bolts 37. The first housing 14 forms a sealed space in which an airtight terminal 38 that is electrically connected to the drive circuit 36 is arranged.

A cluster block 39 is provided in the first housing 14. The airtight terminal 38 is electrically connected to the cluster block 39 that is electrically connected to the electric motor 12. Thus, the electric motor 12 and the drive circuit 36 are electrically connected to each other. The electric motor 12 when supplied with AC power from the drive circuit 36 through the airtight terminal 38 is driven thereby to rotate the rotary shaft 25 and the compression mechanism 11 connected to the rotary shaft 25 is operated, accordingly.

The following will describe the electric motor 12 in detail. The electric motor 12 is a three-phase AC motor driven by the drive circuit 36. The electric motor 12 includes a stator 44 which is fixed to the inner periphery of the first housing 14 and a rotor 40 which is inserted in the stator 44 and fixed on the rotary shaft 25 for rotation therewith. The rotor 40 has a rotor core 41 having therein a plurality of insertion slots (not shown in the drawing) formed in the axial direction P of the rotary shaft 25 and permanent magnets 42 inserted in the respective insertion slots. The rotor core 41 is made of a plurality of laminated core plates 43 made of a metallic magnetic material. The rotor core 41 is fixedly mounted on the rotary shaft 25 for rotation therewith.

Figure 2A:
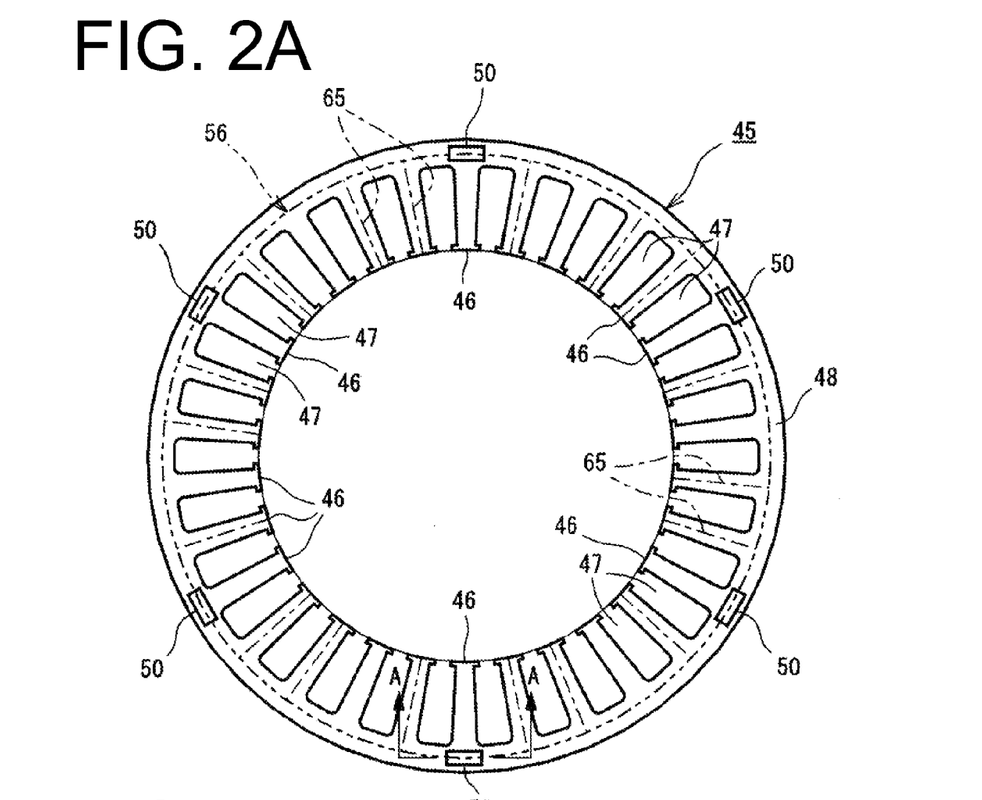
FIG. 2A is a front view showing a stator core that is provided in an electric motor of the compressor of FIG. 1
Figure 2B:
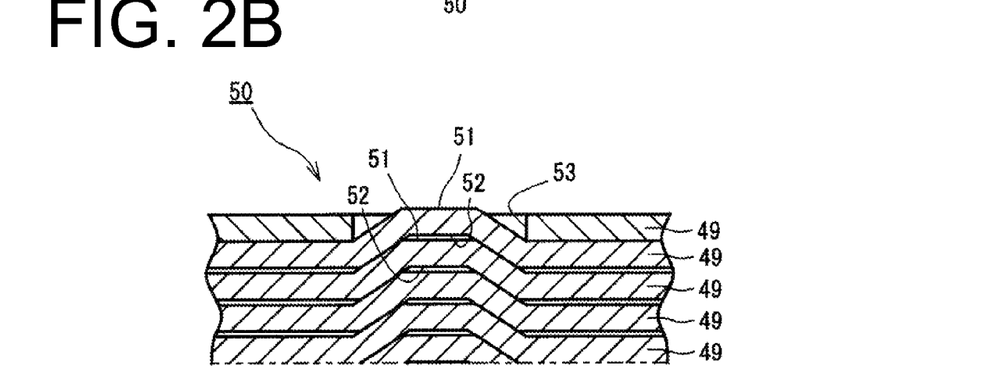
FIG. 2B is a sectional view taken along the line A-A of FIG. 2A.

The stator 44 has annular stator cores 45 fixed on the inner wall of the first housing 14. As shown in FIG. 2A, the stator core 45 has a plurality teeth 46 extending radially inward of the stator core 45 and a slot 47 is formed between any two adjacent teeth 46. The part of the stator core 45 which is radially outward of the teeth 46 in the radial direction of the stator 44 is a yoke 48. The inner periphery of the yoke 48 is a boundary between the yoke 48 and the teeth 46. In the first embodiment, the number of the teeth 46 and the slots 47 is 30. The teeth 46 and the slots 47 are formed at equiangular intervals in the circumferential direction of the stator core 45, respectively. As shown in FIG. 2B, the rotor core 41 is made of a plurality of laminated core plates 49 made of a metallic magnetic material and the core plates 49 are crimped together at the crimped portions 50. As shown in FIG. 2A, the crimped portions 50 are made at six different positions in the yoke 48 that are spaced at equiangular intervals in the circumferential direction of the stator core 45. In the first embodiment, the crimped portions 50 are located in the yoke 48 adjacent to the base of the teeth 46. The base of the teeth 46 is the end thereof adjacent to the yoke 48. As shown in FIG. 2B, the core plate 49 has on one surface thereof a projection 51 that is formed in a substantially trapezoidal shape in cross section and on the opposite surface thereof a recess 52 at a position corresponding to the projection 51. The projection 51 of one core plate 49 is fitted in the recess 52 of another core plate 49 that is located immediately above the one core plate 49 as seen in FIG. 2B, thus the core plates 49 being connected together. A predetermined number of core plates 49 are laminated together to form the stator core 45. It is noted that the core plate 49 located one end of stator core 45 on the projection side has therein holes 53 in which the projections 51 of its adjacent core plate 49 are fittedly inserted as shown in FIG. 2B.

Figure 3:
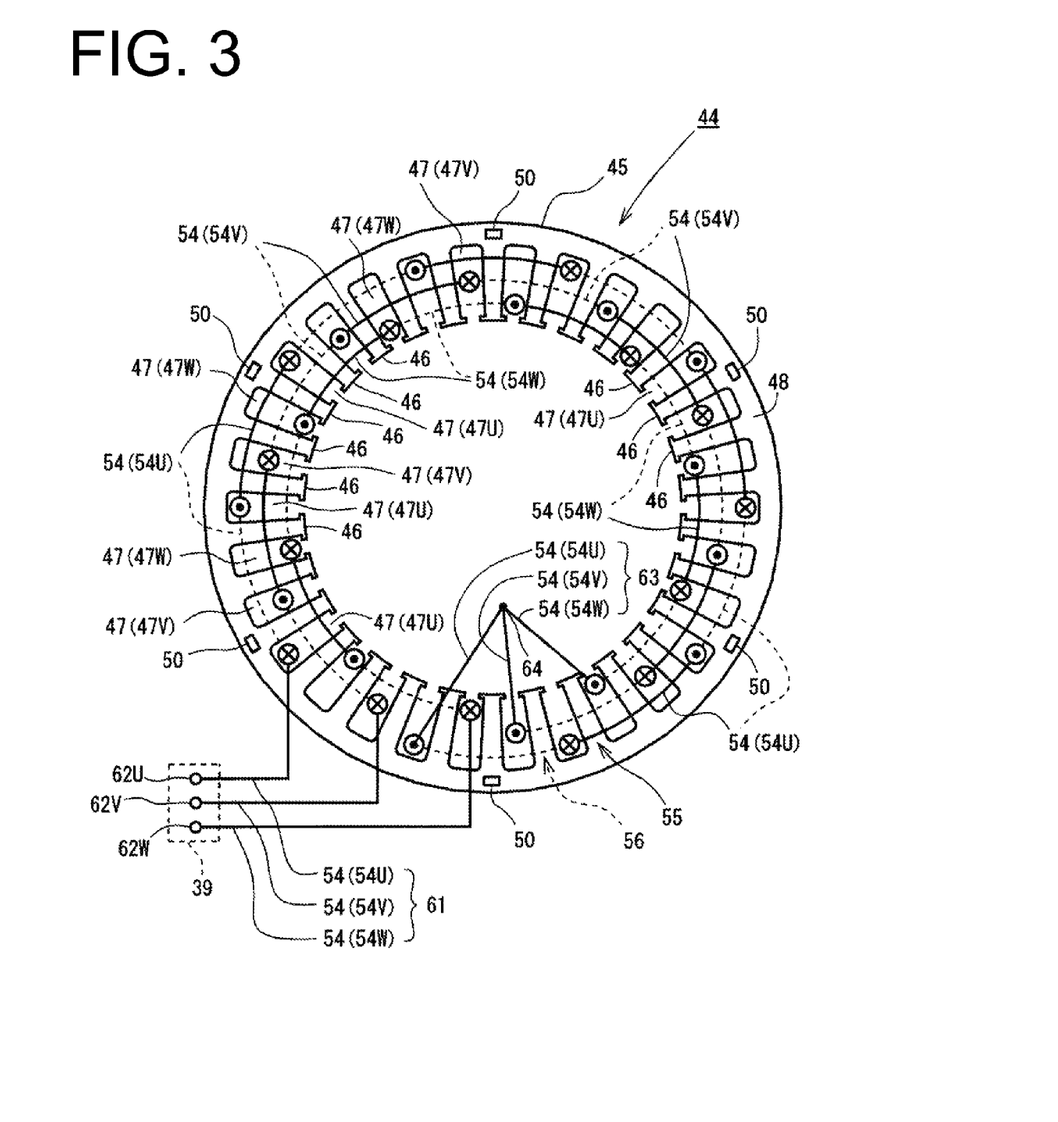
FIG. 3 is a schematic view illustrating wave winding of the stator core of the electric motor in FIG. 1.

As shown in FIG. 3, the slots 47 includes slots 47U for U-phase, slots 47V for V-phase, and slots 47W for W-phase. In the slots 47U, a coil 54U for U-phase is wound in the radially outermost position of the stator 44 in wave winding that is one of distributed windings. In the slots 47V, a coil 54V for V-phase is wound in wave winding in the position that is radially inward of the U-phase coil 54U. In the slots 47W, a coil 54W for W-phase is wound in wave winding in the innermost position of the stator 44.

The coil of the stator core 45 is formed by conductive coils 54 including the coils 54U, 54V, 54W. The conductive coils 54 are made of enamel-coated cupper wire. An insulating sheet (not shown in the drawing) is inserted in each slot 47 to electrically insulate the coils 54U, 54V, 54W from the inner surface of the slots 47U, 47V, 47W, respectively.

As shown in FIG. 3, the parts of the respective coils 54U, 54V, 54W which are shown by solid line form the coil end 55 that is located outside the slots 47U, 47V, 47W and at one end of the stator core 45 adjacent to the compression mechanism 11. The parts of the respective coils 54U, 54V, 54W which are shown by dotted line form the coil end 56 that is located outside the slots 47U, 47V, 47W and at the other end of the stator core 45 adjacent to the drive circuit 36. The rest of the coils 54U, 54V, 54W are disposed in the respective slots 47U, 47V, 47W and not shown in the drawing.

As shown in FIG. 3, the starting ends of the coils 54U, 54V, 54W that are pulled out from the coil end 55 and bundled together form a lead wire 61 for electrical connection of the coils 54U, 54V, 54W to input terminals 62U, 62V, 62W, respectively, in the cluster block 39. Thus, the U-phase coil 54U that is inserted in the U-phase slots 47U is electrically connected to the drive circuit 36 through the input terminal 62U in the cluster block 39. The V-phase coil 54V that is inserted in the V-phase slots 47V is electrically connected to the drive circuit 36 through the input terminal 62V in the cluster block 39. The W-phase coil 54W for W-phase that is inserted in the W-phase slots 47W is electrically connected to the drive circuit 36 through the input terminal 62W in the cluster block 39.

On the other hand, the terminal ends of the coils 54U, 54V, 54W that are pulled out from the coil end 55 and bundled together form a leading part 63. The terminal ends of the coils 54U, 54V, 54W of the leading part 63 are electrically connected to each other by soldering and the connection serves as a neutral point 64 of the electric motor 12. The end of the leading part 63 is wound with an insulating resin film (not shown in drawing) and the insulation of the neutral point 64 is accomplished by sealing the end of the wound insulating resin film. The end of the leading part 63 that is wound with the insulating resin film is fixed to the stator core 45 at one end thereof adjacent to the compression mechanism 11 by a string 65 which will be described below.

Figure 4A:
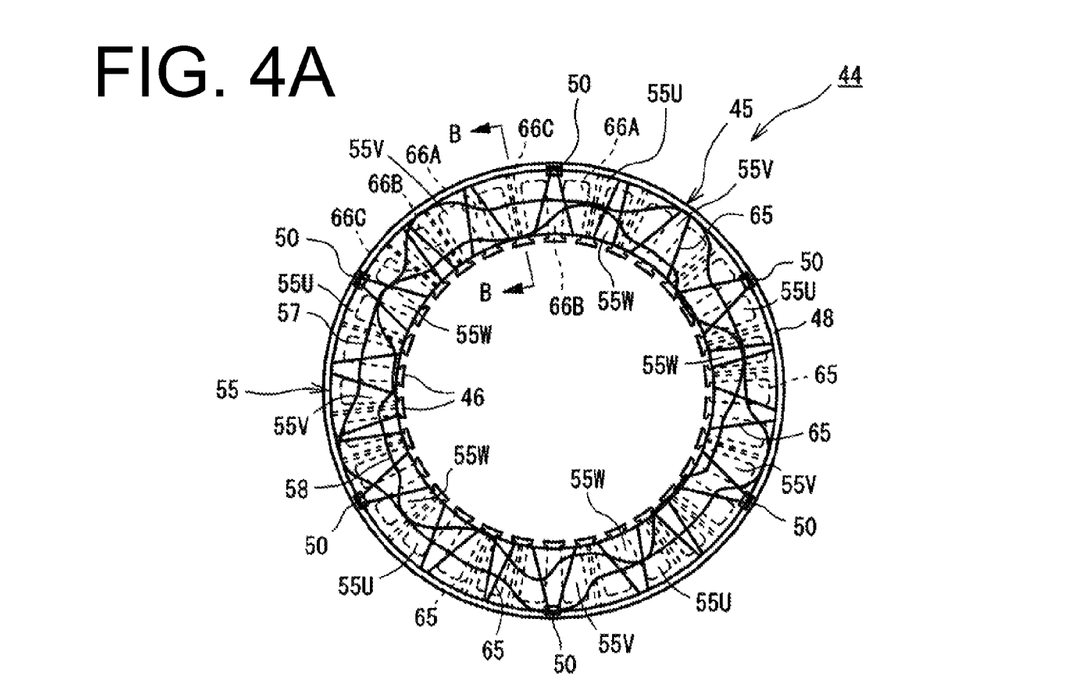
FIG. 4A is a front view showing a coil end that is laced by a string and FIG. 4B is a sectional view taken along the line B-B of FIG. 4A, showing how a crochet needle is used for lacing.
Figure 4B:
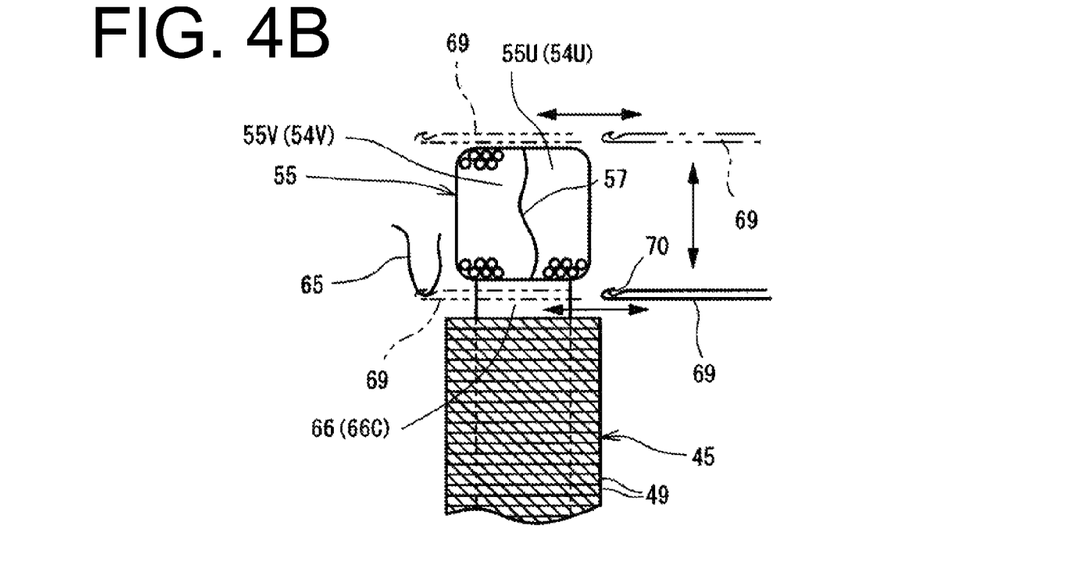
Figure 5:
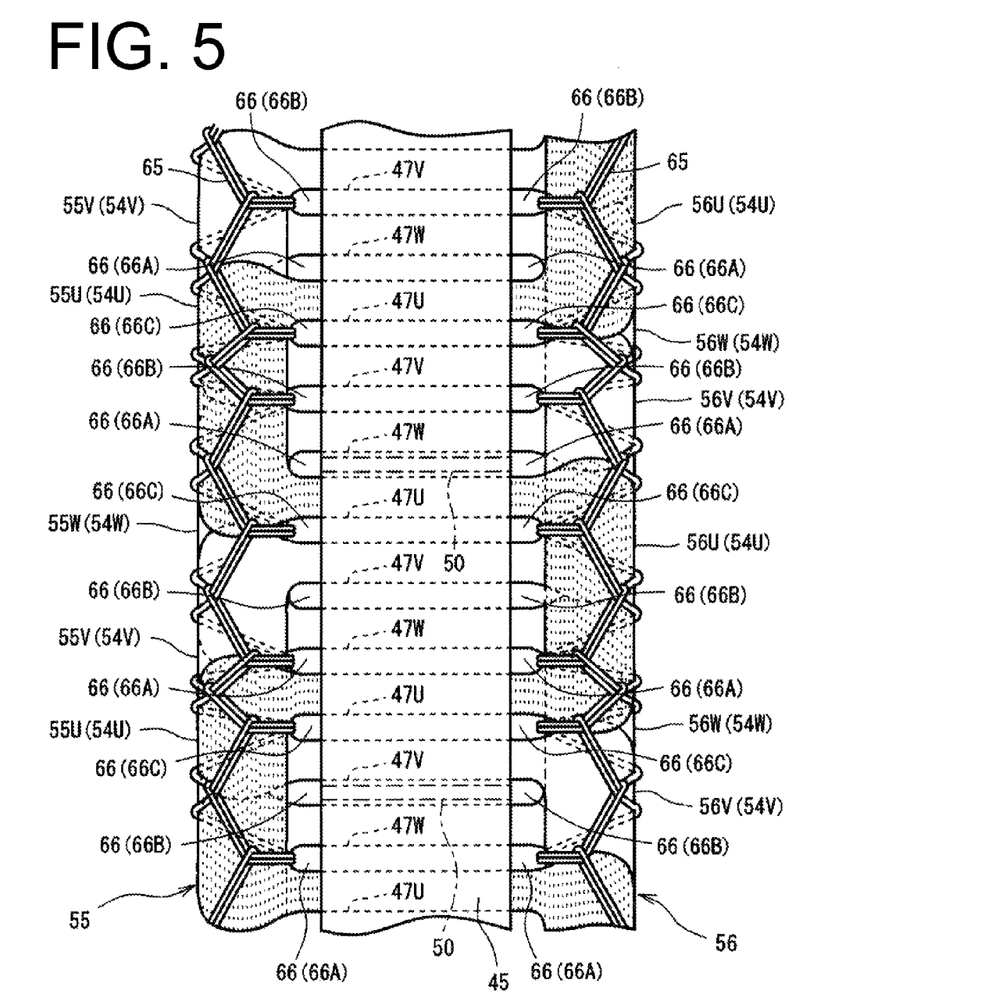
FIG. 5 is a schematic flattened view showing a part of stator core and the coil end of the electric motor in FIG. 1 and how the coil end is laced by a string.

The following will describe lacing of the coil ends 55, 56. Referring to FIGS. 4A, 4B and 5, the coil end 55 (55U, 55V, 55W) at one end of the stator core 45 adjacent to the compression mechanism 11 is laced by a string 65. As shown in FIG. 5, the coil end 56 (56U, 56V, 56W) at the other end of the stator core 45 also is laced by another string 65. It is noted that illustration of the lead wire 61 and the leading part 63 adjacent to the neutral point 64 is omitted in FIG. 4A. In FIG. 5, part of the stator core 45 and of the coil ends 55, 56 is shown in a flattened state for ease of explanation and the coil ends 55U, 56U are hatched for ease of distinction.

As shown in FIG. 4A, on one end of the stator core 45 adjacent to the compression mechanism 11, a first interphase insulation sheet 57 is provided in the circumferential direction of the stator core 45 between the coil end 55U disposed outside the slot 47U and the coil end 55V disposed outside the slot 47V. On the same end of the stator core 45 adjacent to the compression mechanism 11, a second interphase insulation sheet 58 is provided in the circumferential direction of the stator core 45 between the coil end 55V disposed outside the slot 47V and the coil end 55W disposed outside the slot 47W. The first and second interphase insulation sheets 57, 58 are strip sheets made of a resin and overlapped at the opposite ends thereof in the extending direction thereof. Incidentally, on the other end of the stator core 45 adjacent to the drive circuit 36, a third interphase insulation sheet (not shown in the drawing) is provided in the circumferential direction of the stator core 45 between the coil end 56U disposed outside the slot 47U and the coil end 56V disposed outside the slot 47V. On the same end of the stator core 45 adjacent to the drive circuit 36, a fourth interphase insulation sheet (not shown in the drawing) is provided in the circumferential direction of the stator core 45 between the coil end 56V disposed outside the slot 47V and the coil end 56W disposed outside the slot 47W. The third and fourth interphase insulation sheets are strip sheets made of a resin and overlapped at the opposite ends thereof in the extending direction thereof.

As shown in FIG. 5, a teeth space 66 is formed between the coil ends 55U, 55V, 55W and the stator core 45. The teeth space 66 is formed for each tooth 46, but for ease of distinction, the teeth spaces are also designated by 66A, 66B, 66C. The teeth spaces 66A, 66B, 66C are disposed successively in this order in the circumferential direction of the stator core 45.

In the first embodiment, the coil end 55 is laced by the string 65 using a lacing crochet needle 69, as shown in 4B. The crochet needle 69 is initially placed at a position adjacent to the outer periphery of the stator core 45 and reciprocally movable in the axial and radial direction of the stator core 45 by a driving means (not shown in the drawing). The crochet needle 69 has at the tip end thereof a hook 70 for hooking the string 65. The string 65 is supplied from a string supply mechanism (not shown in the drawing) that is movably provided at a position adjacent to the center of the stator core 45. As shown in FIG. 4B, the crochet needle 69 moves in the teeth space 66 and in a region adjacent to the end of coil end 55. Though not shown in the drawing, there are also provided a crochet needle 69 and a string supply mechanism adjacent to the coil end 56 in the same manner as described above with reference to the coil end 55 for lacing the coil end 56 by the string 65.

As shown in FIGS. 4A and 5, the string 65 is not passed through the teeth space 66 having a crimped portion 50 disposed radially outward thereof. The teeth spaces 66 that are located on the opposite sides of the teeth space 66 having the crimped portion 50 disposed radially outward thereof have a string 65 passed therethrough, respectively. As to the teeth spaces other than the teeth space 66 having a crimped portion 50 disposed radially outward thereof and the teeth spaces 66 that are located on the opposite sides of each teeth space 66 having a crimped portion 50 disposed radially outward thereof, no two adjacent teeth spaces 66 are present through which the string 65 is not passed. That is, a string 65 is passed through one of any two adjacent teeth spaces 66. Lacing of the coil end 55 is made in such way that a string is passed through at least one of any two adjacent teeth spaces.

The lacing of the string 65 is substantially the same as the known lacing except that the string 65 is passed through some teeth spaces 66 but not passed through the other teeth spaces 66. In FIG. 5, for example, in the coil end 55U of the coil 54U that is shown lowest in the drawing, the crimped portion 50 is located radially outward of the teeth space 66B that is located at the center of the coil end 55. In the teeth space 66A that is illustrated lowest in FIG. 5, a string 65 that is ring-shaped is passed from a position adjacent to the inner periphery of the teeth space 66A to a position adjacent to the outer periphery of the teeth space 66A by the crochet needle 69. The ring-shaped string 65 that is passed to the position adjacent to the outer periphery of the teeth space 66A is passed through the other ring that is formed by the same string 65 and prepared outside the coil end 55 to a position adjacent to the outer periphery of the teeth space 66A. The string 65 that is ring-shaped and pulled out from the end of the coil end 55 is passed through the ring of the string 65 that is passed to the position adjacent to the outer periphery of the teeth space 66A. The string 65 that is ring-shaped and pulled out from the end of the coil end 55 is used for the next lacing. In the teeth space 66C that is adjacent to the teeth space 66B having the crimped portion 50 disposed radially outward thereof, the string 65 that is ring-shaped is passed from a position adjacent to the inner periphery of the teeth space 66C to the position adjacent to the outer periphery of the teeth space 66C is passed through the ring of the string 65 that is ring-shaped and pulled out from the end of the coil end 55. Thus, in the teeth space 66B having the crimped portion 50 disposed radially outward thereof, the string 65 is not passed. In the teeth spaces 66A, 66C that are located on the opposite sides of the teeth space 66B having the crimped portion 50 disposed radially outward thereof, the string 65 is passed.

As mentioned above, the string 65 is not passed through the teeth space 66 that has a crimped portion 50 disposed radially outward thereof. The string 65 is passed through the teeth spaces 66 that are located on the opposite sides of the teeth space 66 having a crimped portion 50 disposed radially outward thereof. Thus, the coil end 55 is laced and braided by the string 65 over its circumference.

In the coil end 56 on the other end of the stator core 45, the lacing is made substantially in the same manner as that in the coil end 55. The string 65 is not passed through the teeth space 66 that has the crimped portion 50 disposed radially outward thereof. The string 65 is passed in the teeth spaces 66 that are located on the opposite sides of the teeth space 66 having a crimped portion 50 disposed radially outward thereof. The coil end 56 is laced and braided by the string 65 over its circumference.

The coil ends 55, 56 are previously formed circular by a press before the lacing. In the first embodiment, the coil ends 55, 56 that are located on the opposite ends of the stator core 45 are laced simultaneously.

The compressor 10 according to the first embodiment offers the following advantageous effects.

(1) Because the string 65 is not passed through the teeth space 66 having a crimped portion 50 disposed radially outward of the teeth space 66, no interference occurs between the crochet needle 69 and the crimped portion 50 during the lacing operation. Furthermore, because the string 65 is passed through the teeth spaces 66 that are located on the opposite sides of the teeth space 66 having a crimped portion 50 disposed radially outward thereof and the coil ends 55, 56 are laced by the strings 65 in such a manner that a string is passed through at least one of any two adjacent teeth spaces, the coil ends 55, 56 are laced securely.

(2) A string is passed through a teeth space in such a way that no two adjacent teeth spaces 66 are present through which the string 65 is not passed. Therefore, the amount of the string 65 to be used for the lacing is decreased and lacing time is shortened, so that productivity is improved as compared to a compressor in which the teeth spaces other than the teeth spaces 66 having a crimped portion disposed radially outward thereof are all laced by the strings 65.

(3) The plural crimped portions 50 are formed in the stator core 45 at positions adjacent to the base of the teeth 46 in the peripheral direction and spaced at equiangular intervals so as to fix the adjacent core plates 49 together. In such configuration, magnetic flux generated in the stator core 45 flows favorably as compared to a compressor in which the crimped portions are formed at positions adjacent to and radially outward of the slot 47.

(4) Because an even number of the crimped portions 50 is formed at equiangular intervals in the circumferential direction of the stator core 45 and the number of the poles and slots of the electric motor 12 is also even, the magnetic flux flows smoothly, as compared to a compressor in which the number of the crimped portions is odd.

(5) Because no interference occurs between the crochet needle 69 and the string 65 during the lacing, deformation and damage of the crochet needle 69 are prevented, which helps to improve the lacing efficiency.

(6) Because the string 65 is not passed through the teeth space 66 having the crimped portion 50 disposed radially outward thereof, the fear of interference between the crochet needle 69 and the crimped portion 50 is lessened. Therefore, the freedom in designing of a crimped portion that is appropriate in a downsized electric motor is secured.

Second Embodiment

Figure 6:
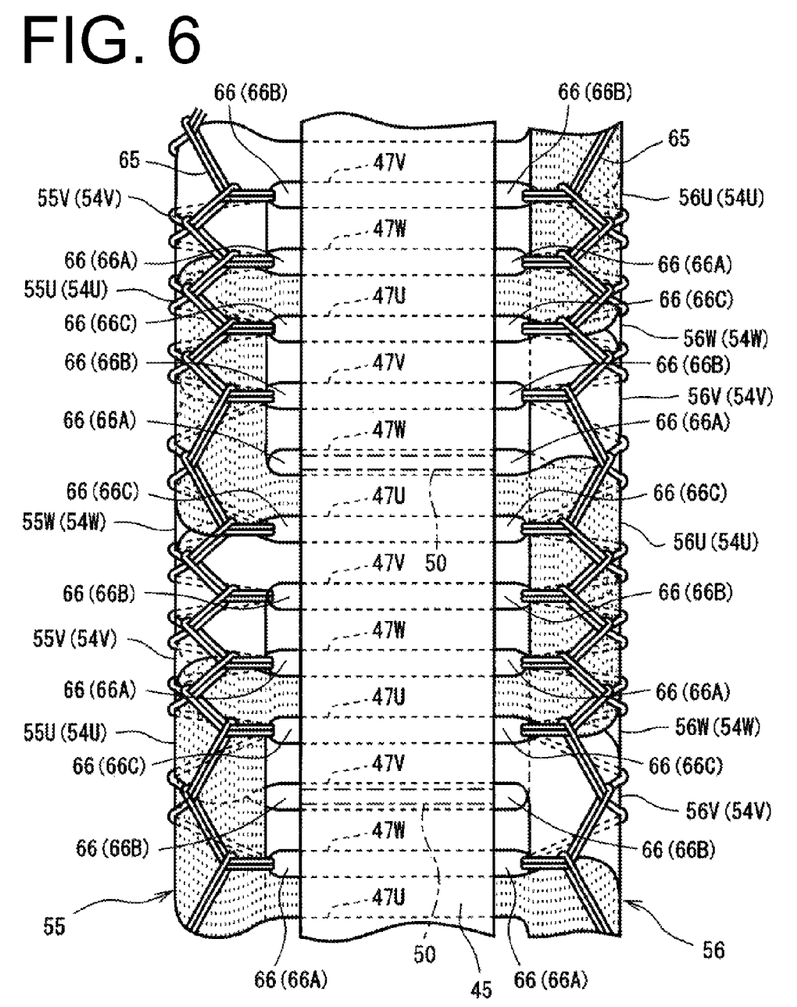
FIG. 6 is a schematic flattened view similar to FIG. 5, showing a part of the stator core and coil end of an electric motor of an electric compressor for a vehicle according to a second embodiment of the present invention, and also illustrating how the coil end is laced by a string.

The following will describe an electric compressor for a vehicle according to the second embodiment of the present invention with reference to FIG. 6. The second embodiment is an example of the compressor in which strings are passed through all the teeth spaces other than the teeth spaces having crimped portions disposed radially outward thereof. In the second embodiment, the method of braiding by strings in the coil ends is different from that in the first embodiment. Therefore, same reference numerals are used in the description of the second embodiment to denote common or similar parts or elements.

As shown in FIG. 6, the string 65 is not passed through the teeth space 66 having the crimped portion 50 disposed radially outward thereof. The strings 65 are passed through all the teeth spaces 66 other than the teeth spaces having the crimped portions disposed radially outward thereof and the strings 65 are passes through the teeth spaces 66 that are located on the opposite sides of the teeth space 66 having a crimped portion 50 disposed radially outward thereof.

The compressor according to the second embodiment offers the advantageous effects that have been described under the paragraphs (1) and (3) through (6) of the first embodiment. In the second embodiment in which the strings 65 are passed through all the teeth spaces 66 other than the teeth spaces having the crimped portions 50 disposed radially outward thereof, the coil ends 55, 56 are laced more securely.

Third Embodiment

Figure 7:
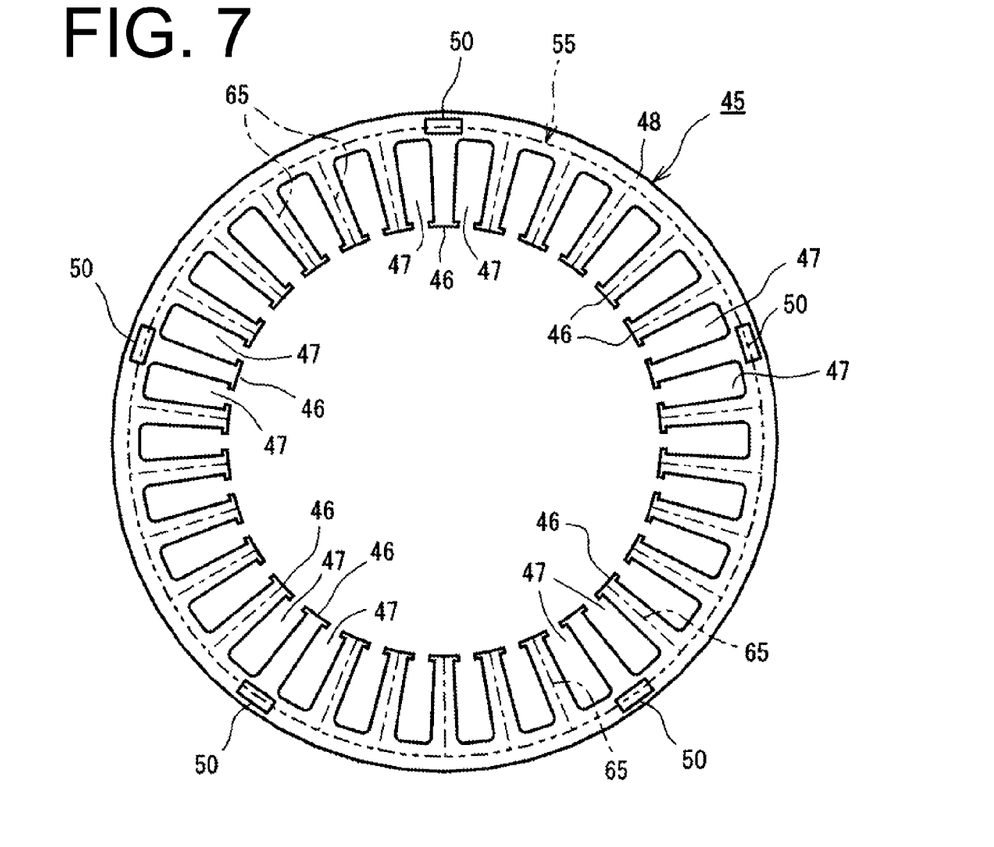
FIG. 7 is a front view showing a stator core that is provided in an electric motor of an electric compressor for a vehicle according to a third embodiment of the present invention.

The following will describe an electric compressor for a vehicle according to the third embodiment of the present invention with reference to FIG. 7. The third embodiment differs from the first embodiment in that the stator core has five crimped portions. Because the third embodiment differs from the first embodiment only in the number of the crimped portions, same reference numerals are used in the description of the third embodiment to denote common or similar parts or elements.

Referring to FIG. 7 showing the stator core 45 of an electric motor for an electric compressor of the third embodiment, five crimped portions 50 are formed in the stator core 45 in the circumferential direction of the stator core 45 at positions that are spaced at equiangular intervals. The odd number of the crimped portions 50, or five crimped portions 50 are disposed at positions that are adjacent to the base of the teeth 46 in the yoke 48. Though, the teeth space 66 that is formed between the end of the stator core 45 and the coil ends 55, 56 is not shown in the drawing, a part of the string 65 is shown in FIG. 7 by dashed line in the tooth 46 corresponding to the teeth space 66 in which the string 65 is passed. The string 65 is not passed in the teeth space 66 that has a crimped portion 50 disposed radially outward thereof. In the third embodiment, the strings 65 are passed through all the teeth spaces 66 other than the teeth spaces 66 having the crimped portion 50 disposed radially outward thereof. Therefore, the strings 65 are passed through the teeth spaces 66 that are located on the opposite sides of the above teeth space having the crimped portion 50 disposed radially outward thereof.

The compressor according to the third embodiment exhibits the advantageous effects that have been described under the paragraphs (1), (3), (5), and (6) of the first embodiment. Though an odd number of the crimped portions is provided, the interference between the lacing crochet needle 69 and the crimped portion 50 is prevented successfully and the coil ends 55, 56 are laced securely by the string 65. Furthermore, the strings 65 are passed through all the teeth spaces 66 other than the teeth spaces having the crimped portion 50 disposed radially outward thereof. Therefore, the coil ends 55, 56 are laced further securely.

The present invention is not limited to the above-described embodiments, but it may be modified or embodied variously within the scope of the invention as exemplified below.

Though the compressor according to the above-described embodiments has a scroll-type compression mechanism including the fixed scroll and the movable scroll, the type of the compression mechanism is not limited. For example, a rotary vane-type compression mechanism or a reciprocating-type compression mechanism using a piston may be adopted. Though the compressor in the above-described embodiments has a three-phase electric motor and the stator core of the electric motor has 10 poles and 30 slots, the number of the poles and the slots of the stator core is not limited. For example, the stator of the electric motor may be configured to have a stator core that forms six poles and 18 slots.

Though the coil is wound in the slot of the stator core by wave winding, the coil may be formed in the slot by concentric winding that is one of the distributed windings. In this case, the string is not passed through the teeth space having a crimped portion disposed radially outward thereof so that no interference occurs between the crochet needle and the crimped portion during the lacing operation. Though, in the above-described embodiments, the crimped portions are disposed in the yoke at a position adjacent to the base of the respective teeth, the position of the crimped portions are not limited. For example, the crimped portion may be formed at a boundary position between the base of the teeth and the yoke. In this case, the length of the crimped portion in the circumferential direction of the yoke may be set smaller than the dimension of the teeth at the base thereof in the circumferential direction of the yoke.

Though, in the third embodiment, the strings are passed through all the teeth spaces other than the teeth space having the crimped portion disposed radially outward thereof, the stator core may be configured otherwise. For example, it may be so configured that the string is not passed through the teeth space having the crimped portion disposed radially outward thereof and strings are passed through the teeth spaces located on the opposite sides of the above teeth space having the crimped portion disposed radially outward thereof. As for the rest of the teeth spaces, the teeth space through which the string is passed and the teeth space through which the string is not passed may be arranged in an alternate manner.

What is claimed is:

1. An electric compressor for a vehicle, the electric compressor being equipped with a rotating electric machine including a stator, the stator comprising:
    a stator core being formed into an annular shape and having an annular yoke and a plurality of teeth that extends radially from the yoke to define a plurality of slots between the teeth, the stator core being formed of a plurality of laminated core plates and having a plurality of crimped portions in boundaries between the yoke and bases of the teeth or in the yoke to fix the core plates together, the crimped portions being spaced at equal intervals in a circumferential direction of the stator core;
    coils of a plurality of phases arranged on the slots, respectively, each coil having a plurality of coil ends that extend out from one end of the stator core in an axial direction of the stator core, wherein a plurality of teeth spaces are defined between each coil end and the stator core and each teeth space is provided for one of the teeth, respectively; and
    a string by which the coil ends are laced in such a way that the string is not passed through the teeth spaces having the crimped portions disposed outward thereof in a radial direction of the stator core, but passed through the teeth spaces that are located adjacently on opposite sides of each of the teeth spaces having the crimped portions disposed radially outward thereof and also passed through at least one of any two adjacent of the teeth spaces.

2. The electric compressor for a vehicle according to claim 1, wherein the string is passed through all the teeth spaces other than the teeth spaces having crimped portions disposed outward thereof in a radial direction of the stator core.

3. The electric compressor for a vehicle according to claim 1, wherein the stator has an even number of the crimped portions.

* * * * *